United States Patent
Ishii (10) Patent No.: US 8,276,049 B2
(45) Date of Patent: Sep. 25, 2012

(54) INFORMATION PROCESSING DEVICE AND METHOD

(75) Inventor: Masaki Ishii, Kanagawa (JP)

(73) Assignee: Ricoh Company Limited, Tokyo (JP)

( * ) Notice: Subject to any disclaimer, the term of this patent is extended or adjusted under 35 U.S.C. 154(b) by 841 days.

(21) Appl. No.: 12/222,346

(22) Filed: Aug. 7, 2008

(65) Prior Publication Data

US 2009/0063932 A1    Mar. 5, 2009

(30) Foreign Application Priority Data

Sep. 4, 2007   (JP) ................................. 2007-229329
Jun. 25, 2008   (JP) ................................. 2008-165945

(51) Int. Cl.
    *H03M 13/00*    (2006.01)
(52) U.S. Cl. ........ 714/776; 714/746; 714/762; 714/764; 714/784; 714/787; 714/788; 714/799; 358/1.8; 358/3.28
(58) Field of Classification Search .................. None
    See application file for complete search history.

(56) References Cited

U.S. PATENT DOCUMENTS

| | | | |
|---|---|---|---|
| 5,923,274 A | 7/1999 | Fischer | |
| 6,490,243 B1 | 12/2002 | Tanaka et al. | |
| 7,079,267 B2* | 7/2006 | Umeda et al. | ................. 358/1.14 |
| 7,116,826 B2 | 10/2006 | Umeda et al. | |
| 7,154,638 B1* | 12/2006 | Lapstun et al. | ............. 358/3.28 |
| 7,253,917 B2* | 8/2007 | Umeda et al. | ................. 358/1.15 |
| 7,620,257 B2 | 11/2009 | Tanaka et al. | |
| 7,702,162 B2* | 4/2010 | Cheong et al. | ................. 382/232 |
| 7,793,191 B2* | 9/2010 | Takamura | ...................... 714/755 |
| 2002/0095629 A1* | 7/2002 | Umeda | ......................... 714/701 |
| 2003/0043749 A1* | 3/2003 | Tanaka et al. | .................. 370/241 |
| 2003/0112471 A1* | 6/2003 | Damera-Venkata et al. | 358/3.28 |
| 2003/0179412 A1* | 9/2003 | Matsunoshita | ............. 358/3.28 |
| 2004/0141632 A1* | 7/2004 | Miyake et al. | ............... 382/100 |
| 2004/0246529 A1* | 12/2004 | Pruden et al. | ............... 358/3.28 |
| 2007/0030521 A1* | 2/2007 | Fujii et al. | .................... 358/3.28 |
| 2007/0180343 A1* | 8/2007 | Kang et al. | .................... 714/746 |
| 2008/0144115 A1 | 6/2008 | Ishii | |
| 2009/0310185 A1* | 12/2009 | Phelan et al. | ................. 358/3.28 |
| 2010/0085607 A1* | 4/2010 | Lapstun | ........................ 358/3.28 |
| 2010/0211855 A1* | 8/2010 | Kang et al. | .................... 714/776 |
| 2010/0275106 A1* | 10/2010 | Song et al. | .................... 714/784 |

FOREIGN PATENT DOCUMENTS

| | | |
|---|---|---|
| JP | 2002-218207 | 8/2002 |
| JP | 2003-101750 | 4/2003 |
| JP | 2003-101756 | 4/2003 |
| JP | 2003-346078 | 12/2003 |

(Continued)

OTHER PUBLICATIONS

Abstract of JP 2005-327266 published Nov. 24, 2005.

(Continued)

*Primary Examiner* — John Trimmings
(74) *Attorney, Agent, or Firm* — Harness, Dickey & Pierce, P.L.C.

(57) ABSTRACT

In an information processing device, error detection information is generated from additional information and a header is generated from error detection information. An encoded header is then generated by appending a header-error correction code to the header and encoded additional information is generated by appending an information-error correction code to the additional information. Finally, an information-appended image is generated by integratedly appending the encoded header and the encoded additional information to the target image.

15 Claims, 10 Drawing Sheets

FOREIGN PATENT DOCUMENTS

| | | |
|---|---|---|
| JP | 2006-107535 | 4/2006 |
| JP | 2006-211611 | 8/2006 |
| JP | 2006-279850 | 10/2006 |
| JP | 3893398 | 12/2006 |
| JP | 2007-005935 | 1/2007 |
| JP | 2007-088693 | 4/2007 |

OTHER PUBLICATIONS

Search Report dated Jan. 28, 2009 for corresponding European Application No. 08252918.1.

Japanese Office Action dated Mar. 6, 2012 issued in corresponding Japanese Application No. 2008-165945.

* cited by examiner

FIG. 6 HEADER: | ERROR DETECTION INFORMATION | SIZE OF ADDITIONAL INFORMATION | TYPE OF HEADER-ERROR CORRECTION CODE | ... |

FIG. 7 ENCODED HEADER: | ERROR DETECTION INFORMATION | SIZE OF ADDITIONAL INFORMATION | TYPE OF HEADER-ERROR CORRECTION CODE | ... | HEADER-ERROR CORRECTION CODE |

FIG. 8 | ADDITIONAL INFORMATION | INFORMATION-ERROR CORRECTION CODE |

FIG. 9 | SEGMENT OF ADDITIONAL INFORMATION | INFORMATION-ERROR CORRECTION CODE | SEGMENT OF ADDITIONAL INFORMATION | INFORMATION-ERROR CORRECTION CODE | ... | SEGMENT OF ADDITIONAL INFORMATION | INFORMATION-ERROR CORRECTION CODE |

INFORMATION PROCESSING DEVICE AND METHOD

CROSS-REFERENCE TO RELATED APPLICATIONS

The present application claims priority to and incorporates by reference the entire contents of Japanese priority document 2007-229329 filed in Japan on Sep. 4, 2007 and Japanese priority document 2008-165945 filed in Japan on Jun. 25, 2008.

BACKGROUND OF THE INVENTION

1. Field of the Invention

The present invention relates to a technology for appending additional information to an image and extracting additional information from an information-appended image.

2. Description of the Related Art

In recent years, information embedding technology is being developed such that additional information can be embedded in a printed literature. The additional information can be information regarding content protection of the printed literature, original digital data of the printed literature, Web pages related to the printed literature, and the like. Such additional information can be embedded by drawing certain image patterns in the printed literature.

One of the conventional methods of information embedding technology is barcode embedding. To embed a barcode, it is necessary to secure a portion for the barcode on the sheet of paper on which the printed literature is printed. However, there is a concern from a security perspective because the portion on the sheet in which a barcode is embedded can be cut off. Therefore, in another conventional technology, image patterns that are not easily noticeable are arranged in the background of the printed literature.

For example, Japanese Patent Application Laid-open No. 2002-218207 discloses an information processing device that multiplexes additional information with image information when the image information is printed on a sheet of paper. In that case, header information is generated that includes size of the additional information, an error correction code used to correct errors in the additional information, and the like.

Japanese Patent Application Laid-open No. 2005-327266 discloses a printing device that generates two-dimensional code information by arranging code information and corresponding error correction codes in a two-dimensional and distributive manner such that a printed literature on a recording medium includes the two-dimensional code information.

Japanese Patent Application Laid-open No. 2007-005935 discloses an information embedding technique in which particular kind of patterns are arranged for embedding additional information in the printed literature. Moreover, an error correction technique is used to make the patterns decodable such that the additional information can be extracted therefrom.

However, there are limitations in using error correction techniques. That is, in the case of an information loss or an error that is not correctable by using an error correction technique, then there is a possibility that incorrect information is decoded. As a result, subsequent information processing functions cannot be performed in a stable and reliable manner.

SUMMARY OF THE INVENTION

It is an object of the present invention to at least partially solve the problems in the conventional technology.

According to an aspect of the present invention, there is provided an information processing device that includes an image obtaining unit that obtains a target image; an additional information obtaining unit that obtains additional information; an error detection information generating unit that generates error detection information from the additional information; a header generating unit that generates a header from the error detection information; a header encoding unit that generates an encoded header by appending a header-error correction code to the header, the header-error correction code being used to correct an error in the header; an additional information encoding unit that generates encoded additional information by appending an information-error correction code to the additional information, the information-error correction code being used to correct an error in the additional information; and an information-appended image generating unit that generates an information-appended image by integratedly appending the encoded header and the encoded additional information to the target image.

According to another aspect of the present invention, there is provided an information processing device that includes an information-appended image obtaining unit that obtains an information-appended image, the information-appended image being generated by integratedly appending an encoded header and encoded additional information to a target image, the encoded header being a header encoded by appending thereto a header-error correction code, the header being generated from error detection information, the encoded additional information being additional information encoded by appending thereto an information-error correction code, the additional information being information to be appended to the target image; an information extracting unit that extracts the encoded header and the encoded additional information from the information-appended image; a header decoding unit that corrects an error in extracted encoded header according to pre-specified details of the header-error correction code and decodes the extracted encoded header to obtain a decoded header; an information decoding unit that corrects an error in extracted encoded additional information according to the information-error correction code and decodes the extracted encoded information to obtain decoded additional information; and a decoding success determining unit that determines whether decoding is successfully performed based on comparison of the error detection information stored in the decoded header and error detection information generated from the decoded additional information.

According to still another aspect of the present invention, there is provided a method of processing information that includes obtaining a target image and additional information; generating error detection information from the additional information; generating a header from the error detection information; generating an encoded header by appending a header-error correction code to the header, the header-error correction code being used to correct an error in the header; generating encoded additional information by appending an information-error correction code to the additional information, the information-error correction code being used to correct an error in the additional information; and generating an information-appended image by integratedly appending the encoded header and the encoded additional information to the target image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments.

An information processing device according to the exemplary embodiments is assumed to be, although not limited to, a standard personal computer (PC).

Figure 1:
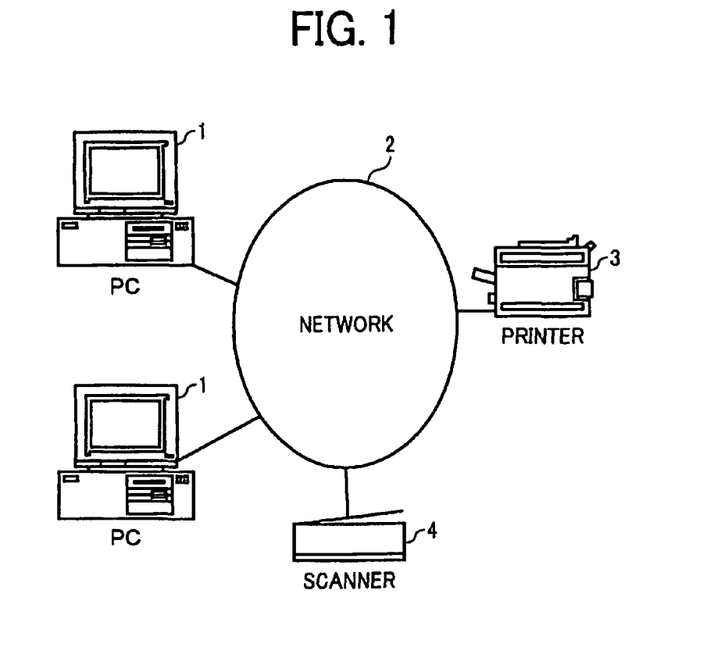
FIG. 1 is a schematic diagram of a printing system according to an embodiment of the present invention.

FIG. 1 is a schematic diagram of a printing system according to an embodiment of the present invention. The printing system includes one or more PCs 1, a printer 3, and a scanner 4 interconnected by a network 2 such as a local area network (LAN). The PC 1 generates digital document data and sends the digital document data to the printer 3 for printing via the network 2. The scanner 4 reads printed digital document data and sends the digital document data to one or more of the PCs 1 for information processing via the network 2.

Figure 2:
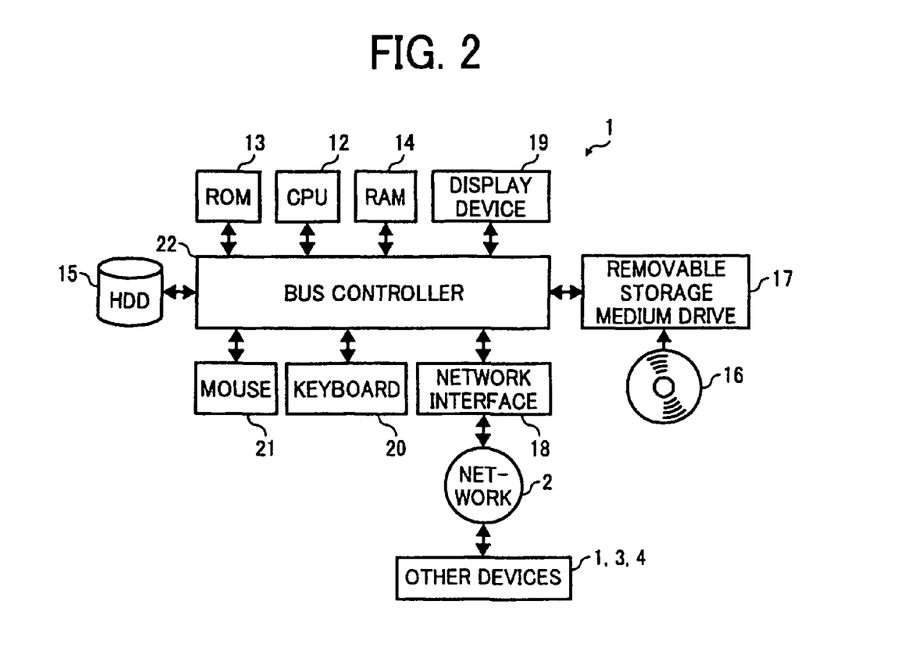
FIG. 2 is a schematic diagram of an exemplary hardware configuration of an information processing device in the printing system.

FIG. 2 is a schematic diagram of an exemplary hardware configuration of the PC 1. The PC 1 includes a central processing unit (CPU) 12, a read only memory (ROM) 13, a random access memory (RAM) 14, a hard disk drive (HDD) 15, a removable storage medium 16, a removable storage medium drive 17, a network interface 18, a display device 19, input devices such as a keyboard 20 and a mouse 21, and a bus controller 22. The ROM 13 used to store a basic input output system (BIOS) and the like. The RAM 14 functions as an intermediate storage unit for temporarily storing information during information processing. The HDD 15 functions as a secondary storage unit for storing application programs, results of information processing, and the like. The removable storage medium 16 is used to store a variety of information. The removable storage medium drive 17 reads information from the removable storage medium 16. The network interface 18 interfaces the PC 1 to the external devices such as the printer 3 and the scanner 4 via the network 2. The display device 19 is used to display processing updates or processing results. The keyboard 20 and the mouse 21 are used to input user instructions or information in the PC 1. The bus controller 22 controls communication between the abovementioned hardware components of the PC 1.

The removable storage medium 16 can be a magnetic storage medium, a magneto-optic storage medium, an optical storage medium, a semiconductor storage medium, and the like. A magnetic storage medium includes a flexible disk, a hard disk, a magnetic tape, and the like. An optical storage medium includes a compact disk (CD), a CD read only memory (CD-ROM), a CD recordable (CD-R), a CD rewritable (CD-RW), a digital versatile disk read only memory (DVD-ROM), a DVD recordable (DVD-R), a DVD random access memory (DVD-RAM), a DVD rewritable (DVD-RW or DVD+RW), and the like.

All the data communication with respect to the PC 1 is performed via the network interface 18. Regarding data transmission from the PC 1, when the network interface 18 receives data, it transmits the data to a destination device via the network 2. On the other hand, upon receiving data from an external device via the network 2, the network interface 18 determines whether the received data that is necessary for the PC 1. If the received data is necessary for the PC 1, then the network interface 18 incorporates the signal. On the other hand, if the data is not necessary for the PC 1, then the network interface 18 destroys the data.

When the PC 1 boots, the CPU 12 executes a loader routine stored in the ROM 13 and loads an operating system (OS) from the HDD 15 into the RAM 14. The OS manages the hardware components and the software programs in the PC 1. Subsequently, according to user instructions, various functions such as executing application programs, reading information, storing information, and the like are performed. An example of the OS is Windows (registered trademark). An application program can be a computer program that runs in the OS, or that performs partial execution of any of the information processing functions described below, or that is included in a set of program files configuring an application software or the OS.

An application program is installed in the HDD 15 from the removable storage medium 16. However, an application program can be directly executed from the removable storage medium 16. Moreover, it is also possible to download the application program via the network interface 18 and install it in the HDD 15.

When an application program runs in the OS, the CPU 12 performs various processing functions and centrally controls the hardware components of the PC 1.

Figure 3:
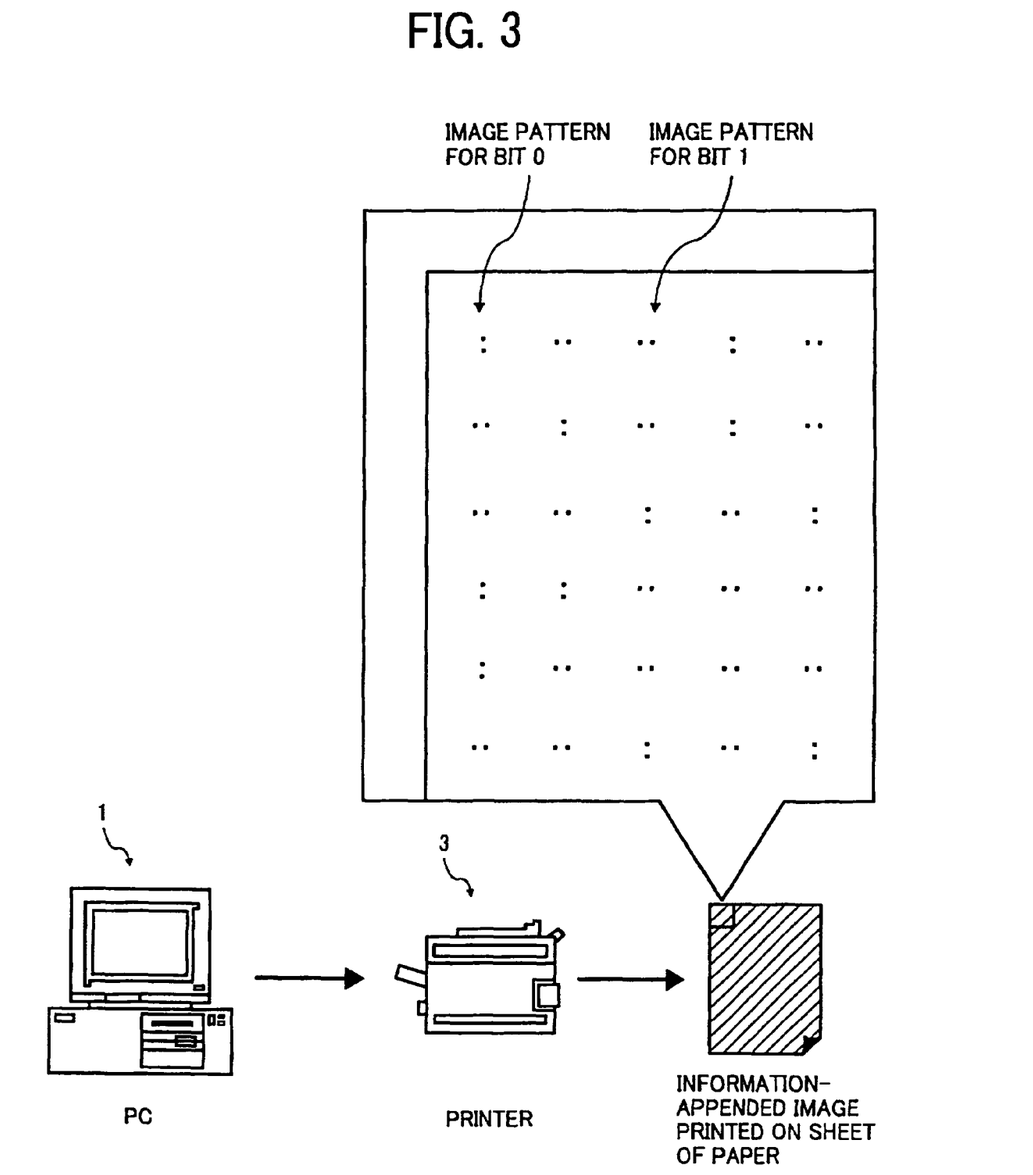
FIG. 3 is a diagram for explaining a process of information processing in the printing system.

The CPU 12 appends additional information to a target image stored in the HDD 15 to generate an information-appended image. Subsequently, the printer 3 prints the information-appended image on a sheet of paper. The additional information includes information regarding storage location of the target image, printing date and time, user ID of the user that instructs printing of the target image, and the like. The additional information is represented in the form of an image pattern. In the example shown in FIG. 3, an image patter '. . . ' represents bit 0 and an image pattern ':' represents bit 1. Meanwhile, instead of using the image patterns for information appending, it is also possible to use a two-dimensional barcode. An information-appended image can be generated in various manners. For example, an information-appended image can be generated by multiplexing the additional information with the target image as described below, or can be directly embedded into the target image.

An information appending program and an information extracting program are stored in the HDD 15. When the information appending program and the information extracting program run in the OS, the CPU 12 performs an information appending process and an information extracting process, respectively.

Figure 4:
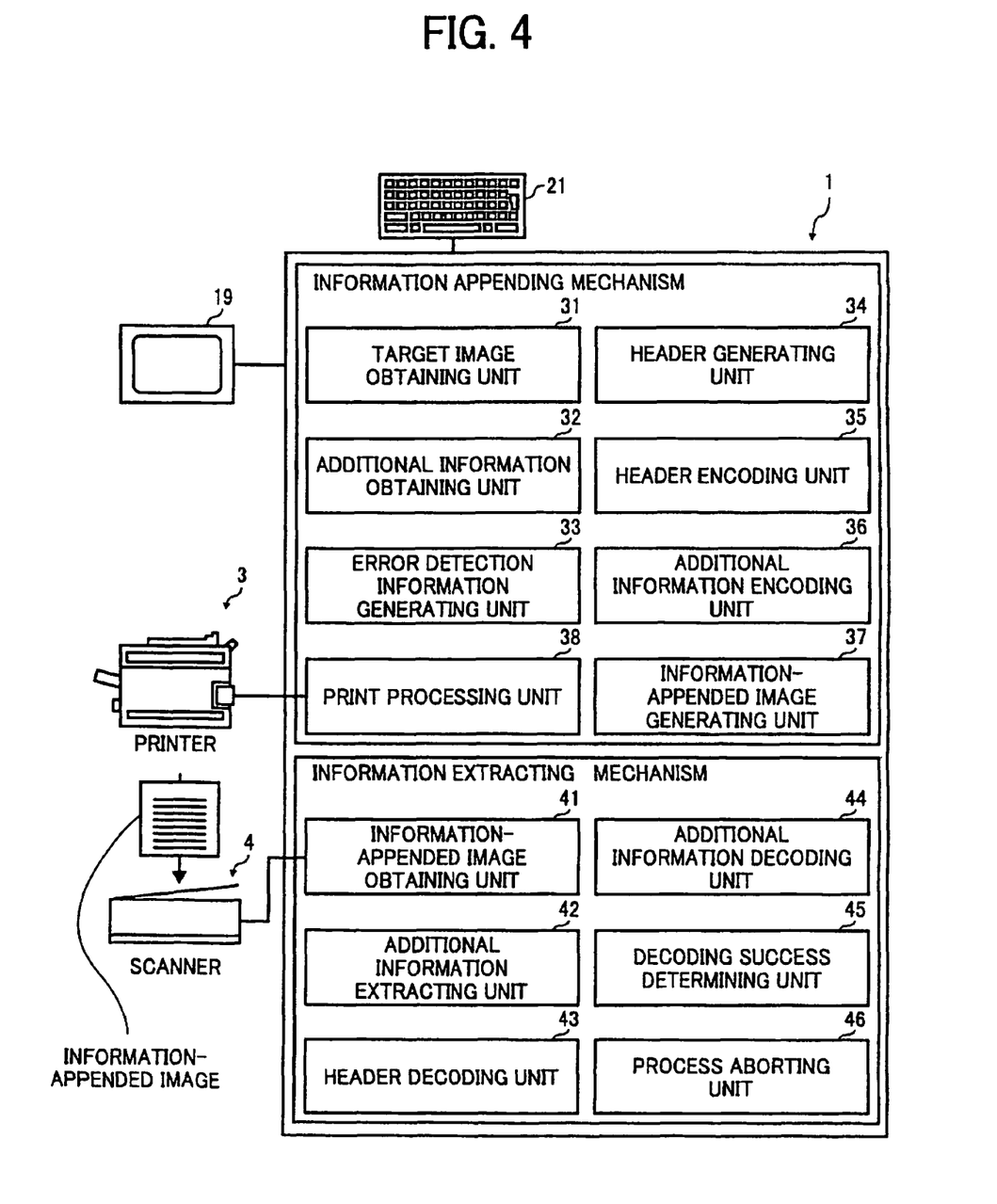
FIG. 4 is a block diagram of a functional configuration of the information processing device.

FIG. 4 is a block diagram of a functional configuration of the PC 1 that performs the information appending process and the information extracting process. When the information appending program runs in the OS, the CPU 12 puts into practice an information appending mechanism that includes a target image obtaining unit 31, an additional information obtaining unit 32, an error detection information generating unit 33, a header generating unit 34, a header encoding unit 35, an additional information encoding unit 36, an information-appended image generating unit 37, and a print processing unit 38. Similarly, when the information extracting program runs in the OS, the CPU 12 puts into practice an information extracting mechanism that includes an information-appended image obtaining unit 41, an additional information extracting unit 42, a header decoding unit 43, an additional information decoding unit 44, a decoding success determining unit 45, and a process aborting unit 46.

Figure 5:
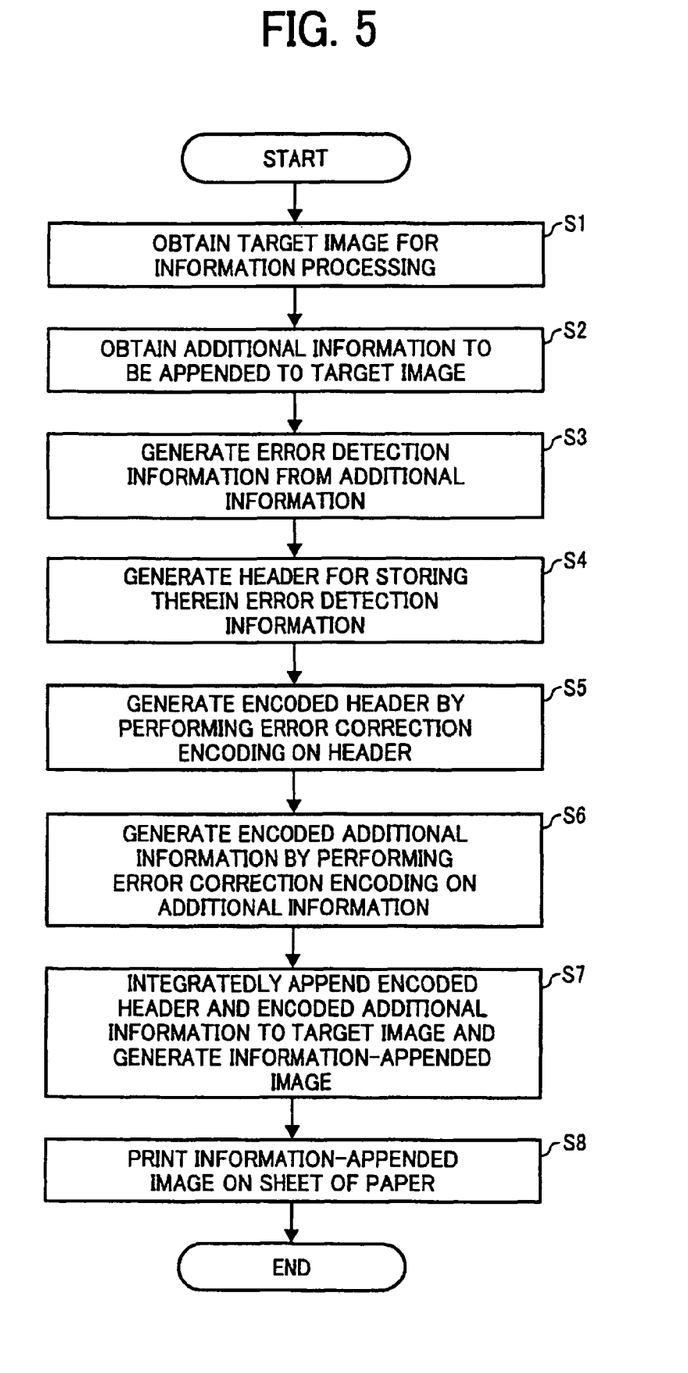
FIG. 5 is a flowchart for explaining an information appending process performed by the information processing device.

FIG. 5 is a flowchart for explaining the information appending process. First, the target image obtaining unit 31 obtains from the HDD 15 a target image to which additional information is to be appended (Step S1). Instead of obtaining a target image from the HDD 15, a target image stored in the removable storage medium 16, or a target image downloaded via the network 2 can also be used.

The additional information obtaining unit 32 then obtains additional information to be appended to the target image (Step S2). For example, the additional information regarding the storage location of the target image or the user ID of the user can be obtained from the PC 1, while the additional information regarding the printing date and time can be obtained from the PC 1 or by using the time stamp authority (TSA).

The error detection information generating unit 33 then generates error detection information from the additional information (Step S3). The error detection information is used to determine whether the information extracting process described later is successfully performed. The error detection information can be in the form of a parity check code, a checksum, a message digest algorithm 5 (MD5) or a secure hash algorithm 1 (SHA-1) based on a hash function, and the like.

Figure 6:
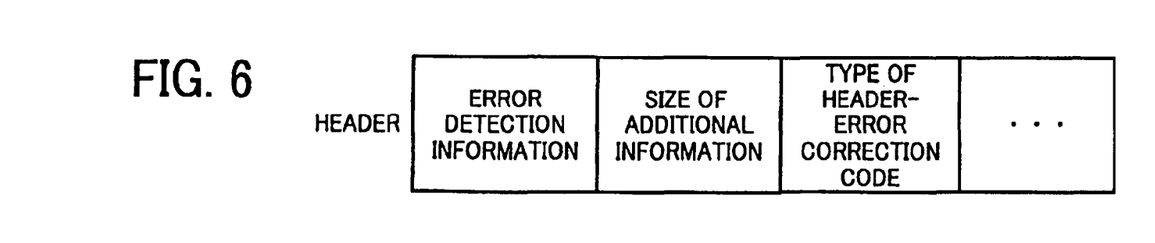
FIG. 6 is a diagram of an exemplary header.

The header generating unit 34 then generates a header, which is a codeword represented as a bit sequence (Step S4). A variety of information such as the error detection information generated at Step S3, the size of additional information, and the type of encoding used to perform error correction encoding on the additional information is stored in the header. FIG. 6 is a diagram of an exemplary header.

Figure 7:
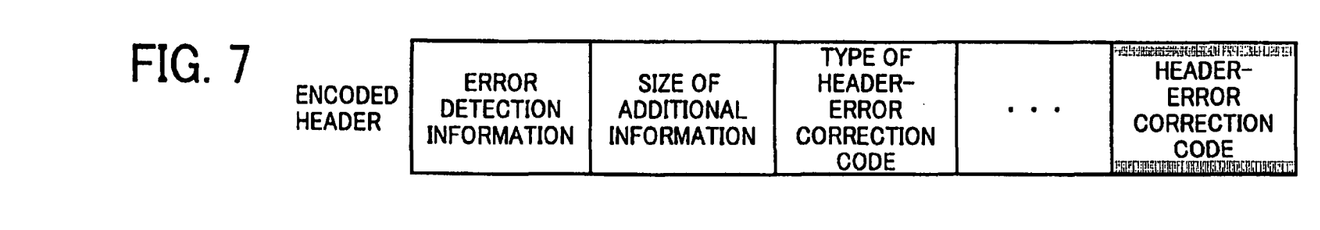
FIG. 7 is a diagram of an exemplary encoded header.

The header encoding unit 35 performs error correction encoding on the header to generate an encoded header (Step S5). More particularly, the header encoding unit 35 appends a header-error correction code to the header. The header-error correction code can be a block control header (BCH) code, a Reed-Solomon code, or a turbo code. FIG. 7 is a diagram of an exemplary encoded header.

Figure 8:
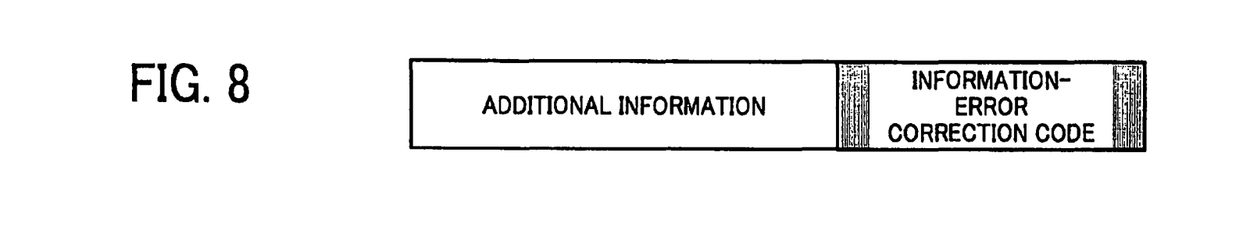
FIG. 8 is a diagram of an exemplary configuration of encoded additional information.
Figure 9:
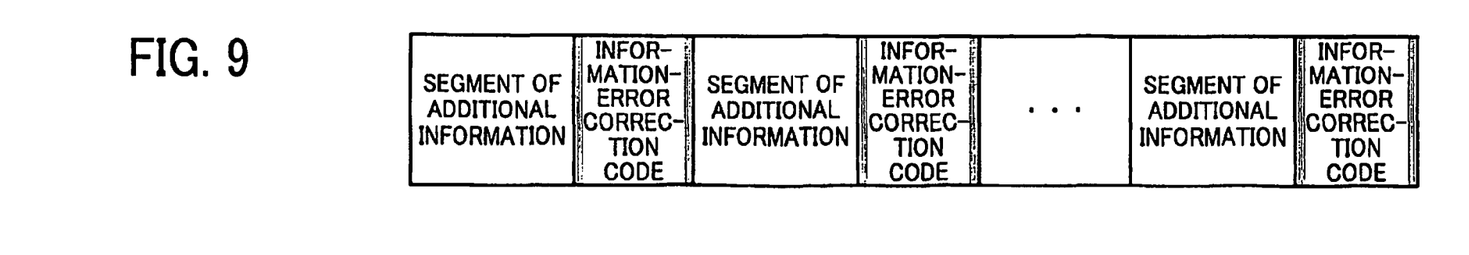
FIG. 9 is a diagram of another exemplary configuration of the encoded additional information.

Similarly, the additional information encoding unit 36 performs error correction encoding on the additional information to generate encoded additional information (Step S6). More particularly, the additional information encoding unit 36 appends an information-error correction code to the additional information. FIG. 8 is a diagram of exemplary encoded additional information. Generally, the additional information has a longer bit length than the header. Thus, in addition to the BCH code or the turbo code, a low density parity check (LDPC) code that works well for a longer bit length can also be used as the information-error correction code for correcting errors in the additional information. Moreover, as shown in FIG. 9, it is also possible to divide the additional information into a plurality of segments of uniform size and perform separate error correction encoding for each segment.

Subsequently, the information-appended image generating unit 37 integratedly appends the encoded header and the encoded additional information to the target image to generate an information-appended image (Step S7).

Figure 10:
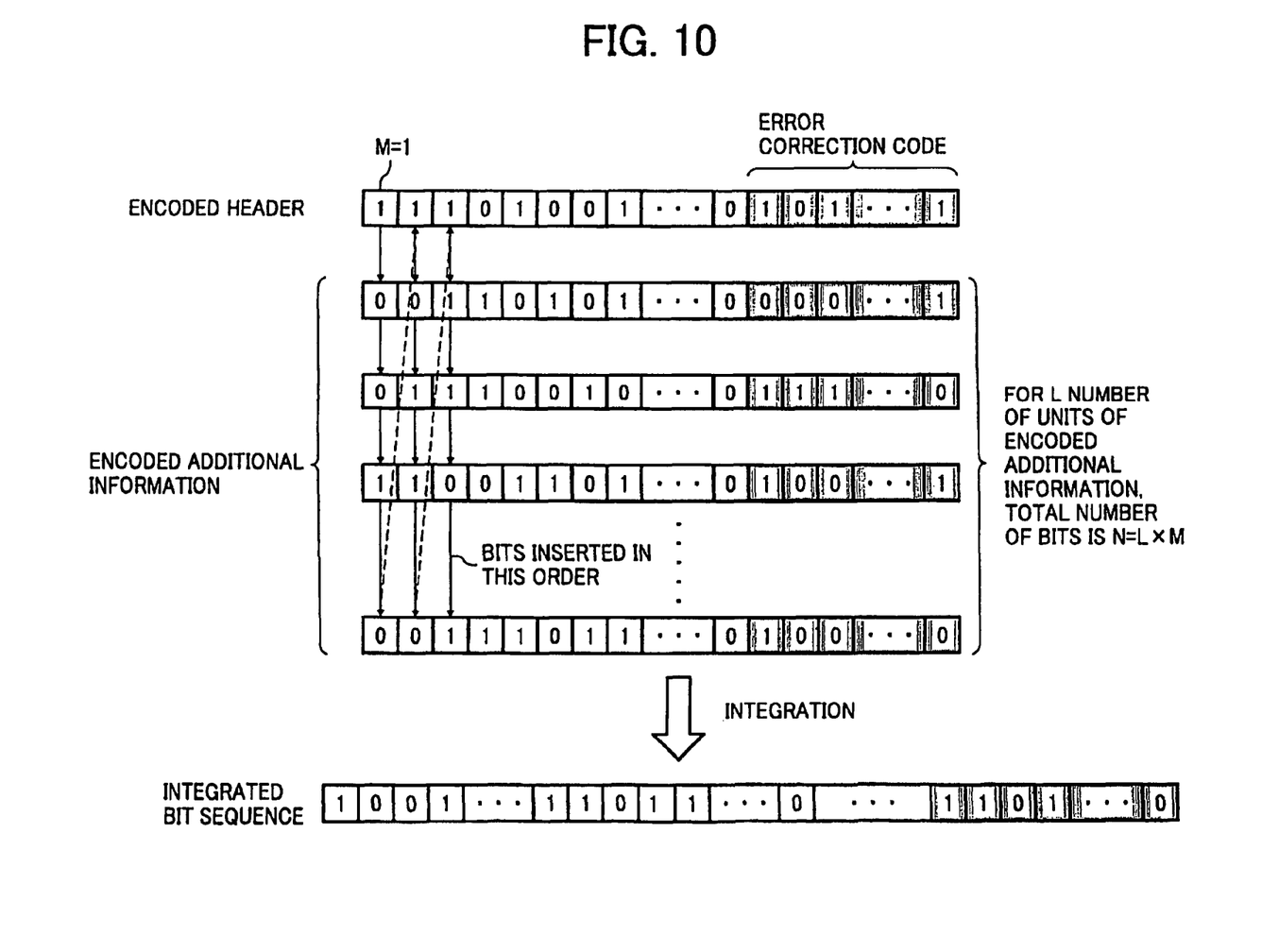
FIG. 10 is a diagram for explaining an exemplary method of appending of an encoded header and encoded additional information to a target image in an integrated and distributive manner.

When the encoded header and the encoded additional information is integratedly appended to the target image, it is necessary to make sure that the information in the encoded header is accurately extractable from the information-appended image even when a burst error occurs. For that, it is necessary to append the encoded header and the encoded additional information to the target image in a distributive manner. FIG. 10 is a diagram for explaining an exemplary method of appending the encoded header and the encoded additional information to the target image in an integrated and distributive manner. In this method, the encoded header is divided into a plurality of segments each having M bits (e.g., M=1). Moreover, each of L number of units of the encoded additional information is divided into a plurality of segments each having M bits such that the total number of bits of the encoded additional information is N (N=L×M). Then, subsequent to each M-bit segment of the encoded header, a corresponding M-bit segment of each of the L number of units of the encoded additional information is sequentially inserted. In this way, an integrated bit sequence is generated from the bit sequence of the encoded header and the bit sequence of the encoded additional information.

Figure 11:
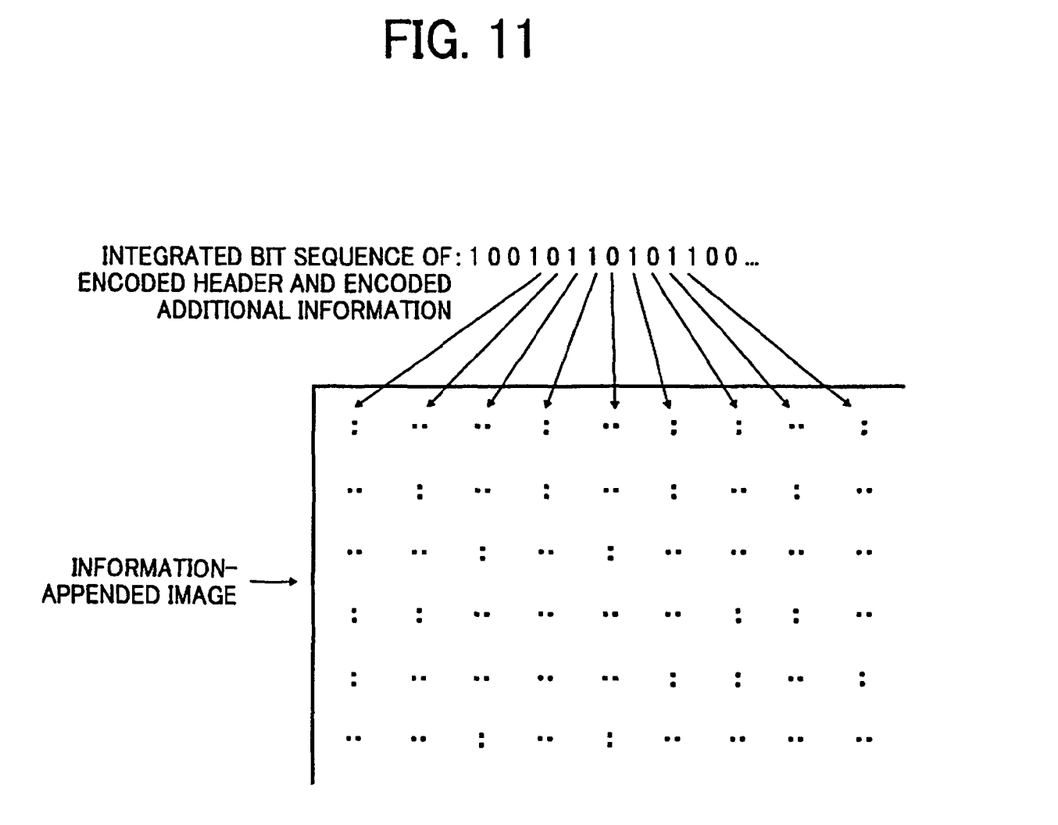
FIG. 11 is a diagram of an exemplary information-appended image printed on a sheet of paper.

Upon completion of generation of an information-appended image at Step S7, the print processing unit 38 prints the information-appended image on a sheet of paper (Step S8). More particularly, a grid-like structure of the image pattern ' . . . ' for bit 0 and the image pattern ':' for bit 1 is multiplexed according to the integrated bit sequence and the information-appended image is printed on a sheet of paper (see FIG. 11).

Figure 12:
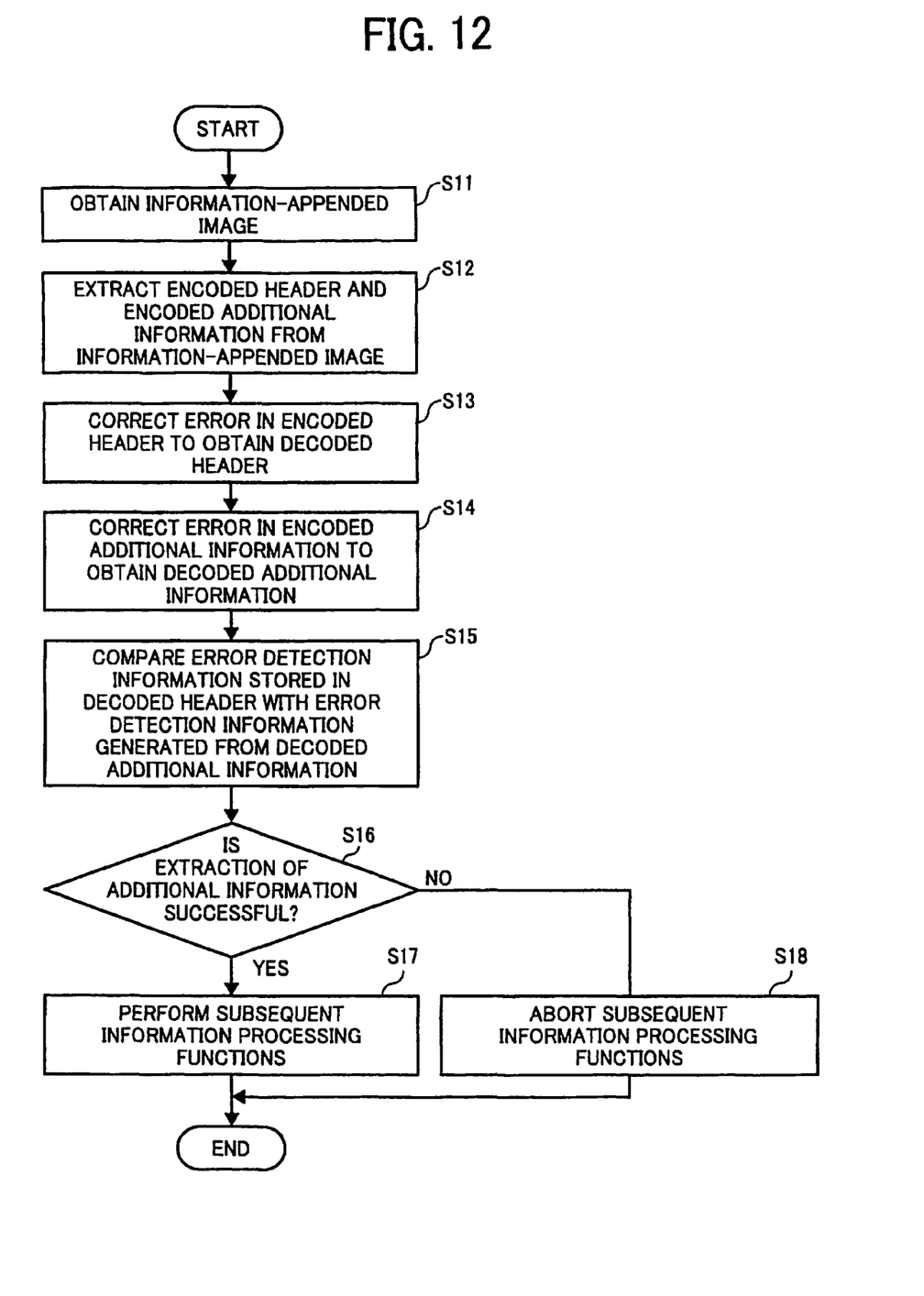
FIG. 12 is a flowchart for explaining an information extracting process performed by the information processing device.

FIG. 12 is a flowchart for explaining the information extracting process. First, the information-appended image obtaining unit 41 obtains an information-appended image from which additional information is to be extracted (Step S11). It is assumed here that the scanner 4 reads an information-appended image from a sheet of paper and transmits the information-appended image to the information-appended image obtaining unit 41 via the network 2 for extracting corresponding additional information. Instead, additional information can also be extracted from an information-appended image stored in advance in the HDD 15 or the removable storage medium 16, or downloaded via the network 2.

The additional information extracting unit 42 identifies the image patterns in the information-appended image, extracts the integrated bit sequence from the information-appended image, and separates the bit sequence of the encoded header and the bit sequence of the encoded additional information from the integrated bit sequence (Step S12). The bit sequence of the encoded header and the bit sequence of the encoded additional information can be separated by reverse executing the method of generating the integrated bit sequence explained with reference to FIG. 10.

The header decoding unit 43 then corrects errors in the separated bit sequence of the encoded header according to the header-error correction code and decodes the encoded header to obtain a decoded header (Step S13). It is assumed herein that the details regarding the type of the header-error correction code are specified in the PC 1 in advance.

Similarly, the additional information decoding unit 44 corrects errors in the bit sequence of the encoded additional information according to the information-error correction code and decodes the encoded additional information to obtain decoded additional information (Step S14). It is possible to specify in advance the type of the information-error correction code in the PC 1 or use the details regarding the type of the header-error correction code.

The decoding success determining unit 45 then determines whether the error detection information stored in the decoded header completely matches with error detection information generated from the decoded additional information (Step S15). The information extracting process is determined to be a success when the error detection information stored in the decoded header completely matches with error detection information generated from the decoded additional information.

When the information extracting process is determined to be a success (Yes at Step S16), various information processing functions are performed based on the decoded additional information (Step S17). For example, when the decoded additional information includes the storage location of the target image, then the corresponding image file is retrieved from the specified storage location and opened in an application software.

When the information extracting process is determined to be a failure (No at Step S16), the process aborting unit 46 aborts the subsequent processing functions and notifies the user about the failure in the information extracting process by, e.g., displaying a message on the display device 19 (Step S18).

However, instead of aborting, it is also possible to perform the subsequent processing functions even if the information extracting process is determined to be a failure.

Figure 13:
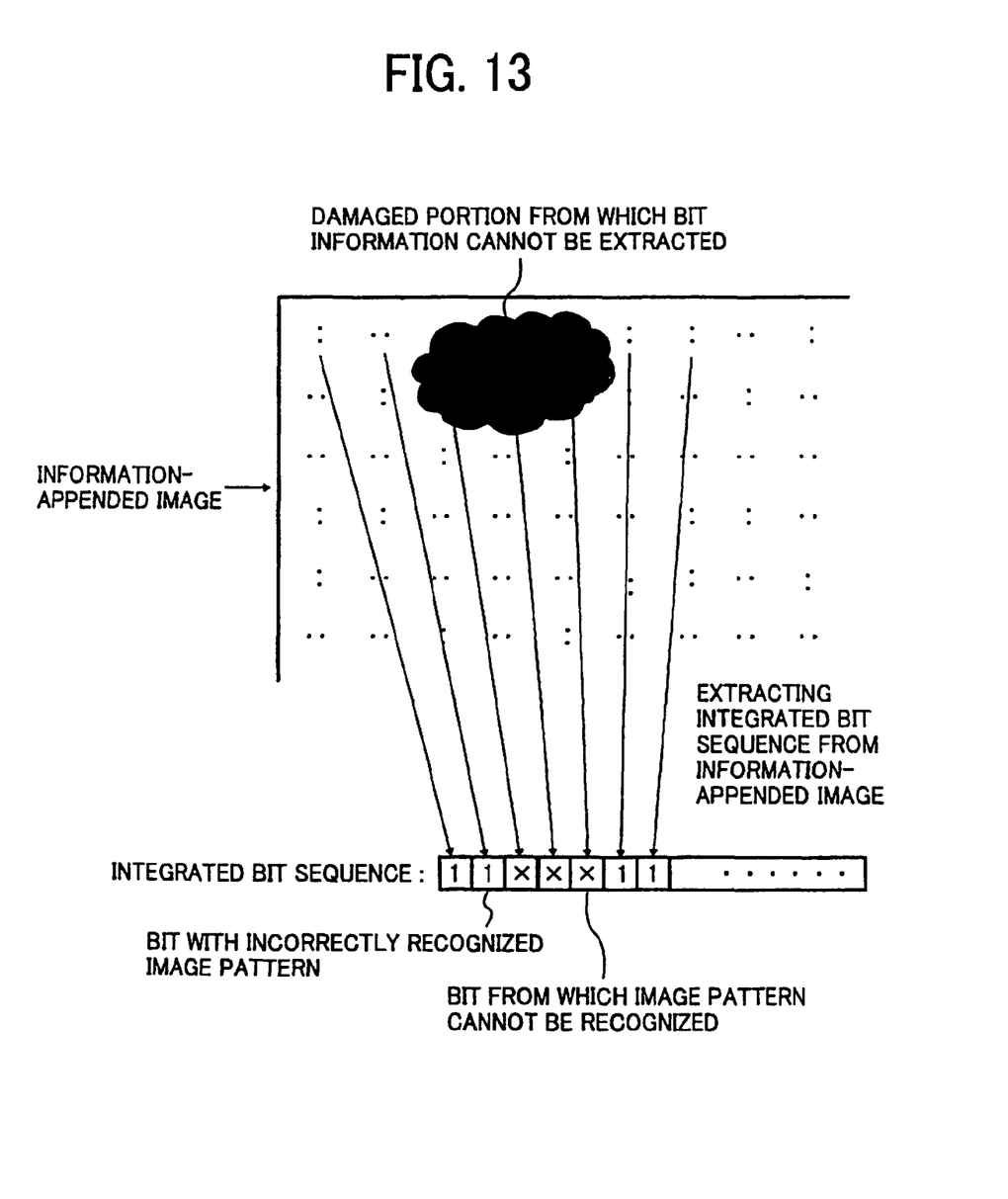
FIG. 13 is a diagram of an information-appended image printed on a sheet of paper that is partially damaged due to a blot.
Figure 14:
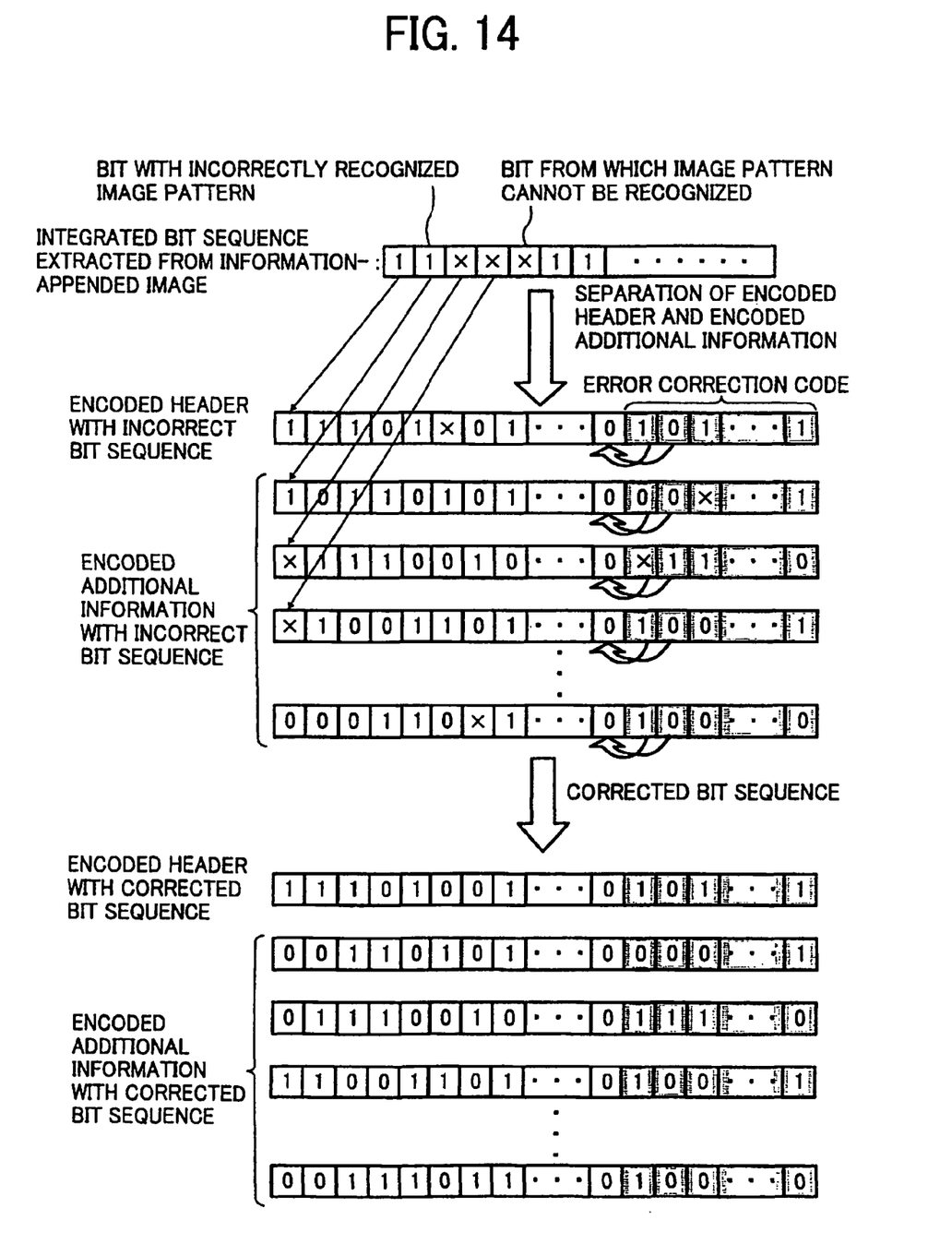
FIG. 14 is a diagram for explaining a method of decoding the encoded header and the encoded additional information from the information-appended image shown in FIG. 13.

FIG. 13 is a diagram of an information-appended image printed on a sheet of paper that is partially damaged due to a blot and the like. If the integrated bit sequence of such a partially damaged information-appended image is obtained, then there is a possibility that the integrated bit sequence includes bits with incorrectly recognized image patterns or bits from which image patterns cannot be recognized. FIG. 14 is a diagram for explaining a method of correctly decoding the encoded header and the encoded additional information from the partially damaged information-appended image shown in FIG. 13. As shown in FIG. 14, the errors in the bit sequence of the encoded header are corrected by using the header-error correction code, which is specified in the PC 1 in advance, to obtain a decoded header. Similarly, the errors in the bit sequence of the encoded additional information are corrected by using the information-error correction code to obtain decoded additional information. Subsequently, it is determined whether the error detection information stored in the decoded header completely matches with error detection information generated from the decoded additional information. In this way, even when there is a damaged portion on the sheet of paper, it is possible to accurately extract the additional information in the information-appended image. As a result, the subsequent information processing functions can be stably and reliably performed.

Thus, to sum up, error detection information is generated from additional information that is to be appended to a target image. The error detection information is used to determine whether information decoding is successfully performed. A header is generated for storing therein the error detection information. Subsequently, a header-error correction code is appended to the header to generate an encoded header. Similarly, an information-error correction code is appended to the additional information to generate encoded additional information. The encoded header and the encoded additional information are then integratedly appended to the target image to generate an information-appended image. While extracting the additional information from the information-appended image, it is determined whether the error detection information stored in the decoded header completely matches with error detection information generated from the decoded additional information. As a result, it is possible to efficiently and accurately extract additional information from an information-appended image.

Moreover, because the encoded header and the encoded additional information are appended to the target image in a distributive manner, the encoded header can be accurately decoded even when a burst error occurs.

Furthermore, because the encoded header is decoded by using the header-error correction code, the encoded additional information is decoded by using the information-error correction code, and the success of the information extracting process is determined by using the error detection information stored in the decoded header, it is possible to accurately extract the additional information from the information-appended image. As a result, the subsequent information processing functions can be stably and reliably performed.

Meanwhile, although the information appending process and the information extracting process are performed in a single PC 1 as described above, it is possible to perform those processes in different PCs 1.

Moreover, instead of using the PC 1, it is possible to use a printer, a scanner, or a multifunction product (MFP) that has printing and scanning functions as an information processing device.

Thus, according to an aspect of the present invention, it is possible to efficiently and accurately extract additional information from an information-appended image.

Consequently, subsequent information processing functions can be stably and reliably performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
   an image obtaining unit configured to obtain a target image;
   an additional information obtaining unit configured to obtain additional information;
   an error detection information generating unit configured to generate error detection information based on the additional information;
   a header generating unit configured to generate a header of the additional information that stores the error detection information;
   a header encoding unit configured to generate an encoded header by appending a header-error correction code to the header, the header-error correction code being used to correct an error in the header;

an additional information encoding unit configured to generate encoded additional information by appending an error correction code to the additional information, the error correction code being used to correct an error in the header that is added to the header;

an information-appended image obtaining unit configured to obtain the information-appended image;

an information extracting unit configured to extract the encoded header and the encoded additional information from the information-appended image;

a header decoding unit configured to correct an error in extracted encoded header according to pre-specified details of the header-error correction code and configured to decode the extracted encoded header to obtain a decoded header;

an information decoding unit configured to correct an error in extracted encoded additional information according to the information-error correction code and configured to decode the extracted encoded additional information to obtain decoded additional information; and an information-appended image generating unit configured to generate an information-appended image by integratedly appending the encoded header and the encoded additional information to the target image.

2. The information processing device according to claim 1, further comprising:
a decoding success determining unit configured to determine whether decoding is successfully performed based on comparison of the error detection information stored in the decoded header and error detection information generated from the decoded additional information.

3. The information processing device according to claim 2, wherein when the decoding is determined to be a failure, the decoding success determining unit aborts information processing.

4. The information processing device according to claim 3, wherein when the decoding is determined to be a failure, the decoding success determining unit outputs a notification of failure in extracting the additional information.

5. The information processing device according to claim 1, wherein the information-appended image generating unit integratedly appends the encoded header and the encoded additional information to the target image in a distributive manner.

6. The information processing device according to claim 5, wherein the information-appended image generating unit generates an integrated bit sequence from a bit sequence of the encoded header and a bit sequence of the encoded additional information according to a predetermined method.

7. An information processing device comprising:
an information-appended image obtaining unit configured to obtain an information-appended image, the information-appended image being generated by integratedly appending an encoded header and encoded additional information to a target image, the encoded header being a header encoded by appending thereto a header-error correction code, the header being generated of the additional information that stores error detection information, the encoded additional information being additional information encoded by appending thereto an information-error correction code, the additional information being information to be appended to the target image;

an information extracting unit configured to extract the encoded header and the encoded additional information based on the information-appended image;

a header decoding unit configured to correct an error in extracted encoded header according to pre-specified details of the header-error correction code and configured to decode the extracted encoded header to obtain a decoded header;

an information decoding unit configured to correct an error in extracted encoded additional information according to the information-error correction code and decode the extracted encoded information to obtain decoded additional information; and a decoding success determining unit configured to determine whether decoding is successfully performed based on comparison of the error detection information stored in the decoded header and error detection information generated from the decoded additional information.

8. The information processing device according to claim 7, wherein when the decoding is determined to be a failure, the decoding success determining unit aborts information processing.

9. The information processing device according to claim 8, wherein when the decoding is determined to be a failure, the decoding success determining unit outputs a notification of failure in extracting the additional information.

10. A method of processing information, the method comprising:
obtaining a target image and additional information;
generating error detection information based on the additional information;
generating a header of the additional information that stores the error detection information;
generating an encoded header by appending a header-error correction code to the header, the header-error correction code being used to correct an error in the header;
generating encoded additional information by appending an information-error correction code to the additional information, the information-error correction code being used to correct an error in the additional information; and
generating an information-appended image by integratedly appending the encoded header and the encoded additional information to the target image.

11. The method according to claim 10, further comprising:
obtaining the information-appended image;
extracting the encoded header and the encoded additional information from the information-appended image;
correcting an error in extracted encoded header according to pre-specified details of the header-error correction code and decoding the extracted encoded header to obtain a decoded header; correcting an error in extracted encoded additional information according to the information-error correction code and decoding the extracted encoded additional information to obtain decoded additional information; and
determining whether decoding is successfully performed based on comparison of the error detection information stored in the decoded header and error detection information generated from the decoded additional information.

12. The method according to claim 11, wherein it is determined that the decoding is a failure, the method further comprising aborting information processing.

13. The method according to claim 12, wherein it is determined that the decoding is a failure, the method further comprising outputting a notification of failure in extracting the additional information.

14. The method according to claim 10, wherein the generating an information-appended image includes integratedly appending the encoded header and the encoded additional information to the target image in a distributive manner.

15. The method according to claim 14, wherein generating an information-appended image includes generating an integrated bit sequence from a bit sequence of the encoded header and a bit sequence of the encoded additional information according to a predetermined method.

* * * * *